United States Patent [19]

Tanguay

[11] 3,709,265
[45] Jan. 9, 1973

[54] SAWING AND DISCHARGING STATION FOR A TREE SLASHER

[75] Inventor: Jean Paul Tanguay, St. Prime, Quebec, Canada

[73] Assignee: Placements Jean Paul Tanguay Limited, Quebec, Canada

[22] Filed: Oct. 26, 1970

[21] Appl. No.: 83,850

[52] U.S. Cl. .......................... 83/404.2, 83/404.3, 83/404.4, 83/732, 83/409, 83/417, 83/467
[51] Int. Cl. ............................................. B27b 5/00
[58] Field of Search ......... 143/46 R, 46 F, 48, 41, 49, 143/157 E; 144/3, 312

[56] References Cited

UNITED STATES PATENTS

| 3,500,882 | 3/1970 | Tanguay | 143/46 R |
| 3,550,653 | 12/1970 | Gauthier et al. | 143/46 F |
| 2,569,878 | 10/1951 | Avinger et al. | 143/46 R |

Primary Examiner—Donald R. Schran
Attorney—Raymond A. Robic

[57] ABSTRACT

A sawing and discharging station for a tree slasher provided with a conveyor adapted to drive tree stems in a predetermined direction. The station comprises a transfer tables disposed to receive tree stems from the said conveyor and an arresting plate at the end of the table opposite the receiving end whereby tree stems may be driven by the conveyor until one end abuts the arresting plate. The station has a first rotary saw to cut the tree stems to produce logs of predetermined full length and a transfer conveyor movable perpendicularly to the direction of the tree stem conveyor to discharge logs cut by the first rotary saw selectively on either side of the table. A second rotary saw is mounted laterally of the tree stem conveyor and the arresting plate to cut logs obtained by the first saw into half length logs. The station finally comprises log collectors on either side of the table to receive the full and half length logs, respectively.

7 Claims, 6 Drawing Figures

INVENTOR
Jean Paul TANGUAY

ATTORNEY

PATENTED JAN 9 1973

INVENTOR
Jean Paul TANGUAY

ATTORNEY

PATENTED JAN 9 1973 3,709,265

INVENTOR
Jean Paul TANGUAY

ATTORNEY

SAWING AND DISCHARGING STATION FOR A TREE SLASHER

The present invention relates to a sawing and discharging station for a tree slasher to allow the production of logs in two predetermined selected lengths and the discharge of the said logs on either side of the slasher.

Tree slashers of the general type to which the present invention is directed are already known as exemplified by my Canadian Pat. No. 769,109 of Oct. 8, 1968 and U.S. Pat. No. 3,500,882 of Mar. 17, 1970. However, in this known slasher the tree stems are produced in only one final length and discharged on one side of the main tree stem conveyor. Obviously, logs obtained with the slasher disclosed in my previous patents need be discharged only on one side of the main conveyor since selection as to size and length are not possible.

It is however often necessary that logs be obtained in one predetermined length if the tree stem diameter is beyond a certain size while tree stems of a smaller diameter are to be sawed into logs having only half the length of the larger ones.

It is consequently an object of the present invention to improve the previously known slasher by providing a sawing and discharging station wherein oversized logs may be cut into logs of predetermined lengths and discharged laterally on one side of the main conveyor while undersized logs are cut into half lengths and discharged on the other side.

This object is attained in a sawing and discharging station, made according to the invention, and adapted to be provided at the discharge end of the tree stem conveyor of a tree slasher. The station comprises a transfer table at the discharge end of the tree stem conveyor, the table having an arresting member at the end thereof away from the conveyor discharge end and a first rotary saw adapted to cut three stems to produce logs of predetermined full length. The station also comprises a transfer conveyor movable perpendicularly to the direction of travel of the tree stem conveyor to discharge logs cut by the first rotary saw selectively on either side of the table; a second rotary saw mounted laterally of the tree stem conveyor and the arresting member to cut logs obtained by the first saw into half length logs, and log collectors mounted on either side of the table between the ends thereof to receive the full and half length logs, respectively.

In a preferred embodiment of the invention, means are provided on at least one side of the table to push logs, that have accumulated in the corresponding collector, away from the table side to make room for incoming logs.

Also in a preferred embodiment of the invention, the log collector disposed on the side of the table where the half length logs are discharged is divided into two parts by a longitudinal partition wall and a guide plate is provided on the downstream end of the second rotary saw, this guide plate extending edgewise around a portion of the saw and having a thickness increasing gradually from the second saw to the corresponding collector to force the half length logs into the proper one of the collector parts.

It is believed that a better understanding of the invention will be afforded by the following description of a preferred embodiment thereof having reference to the appended drawings wherein.

Figure 1:
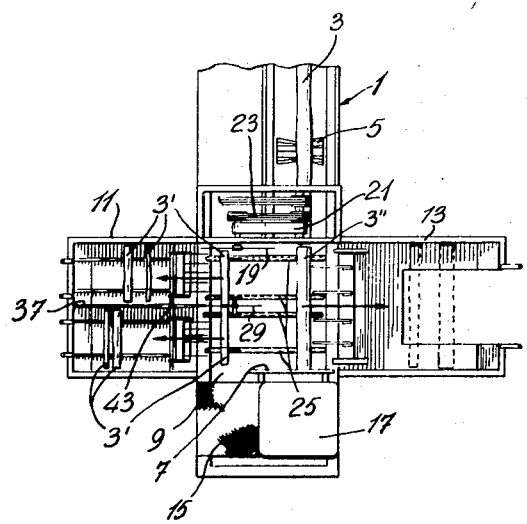
FIG. 1 is a top plan view of a sawing and discharging station made according to the invention.
Figure 6:
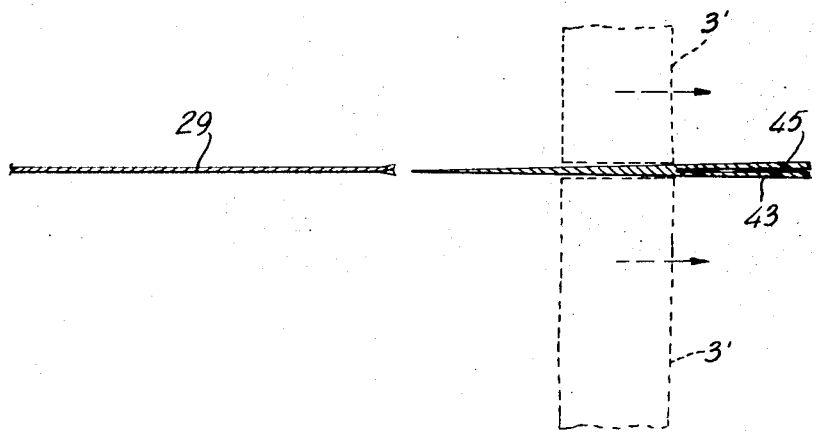
FIG. 6 is a cross-sectional view along line 6—6 of FIG. 2.

Referring now to FIG. 1, there is shown the rear end of a tree slasher of the type disclosed in my aforementioned patents and including a conveyor 1 of the roller gripping type such as 5 driving a tree stem 3 against an arresting plate 7 provided at one end of a transfer table 9 which forms part of the sawing and discharging station of my invention. As will be fully explained hereinafter, logs produced on the transfer table 9 are discharged laterally either in a leftward collector 11, more fully illustrated in FIGS. 2 and 3, or a rightward collector 13, more fully illustrated in FIGS. 4 and 5.

A platform 15 is provided on the side of table 9 adjacent the arresting plate 7 and over which stands the operator control cab 17.

All logs driven by conveyor 1 so that the forward ends thereof abut the arresting plate 7 are caught by a first rotary saw 19 mounted at the end of a swingable arm 21 and brought into rotation by a belt drive 23 in the conventional manner described in my aforesaid patents.

As best illustrated in FIG. 1, the transfer table 9 has a transfer conveyor on the top thereof adapted for displacement perpendicularly of the tree stem conveyor 1 and in either direction selectively toward collector 11 or collector 13. As shown, the transfer conveyor consists of a plurality of endless chains 25 each provided with spaced triangular upright teeth 27 (FIG. 3) intended to force logs 3' against a second rotary saw 29. Chains 25 are driven by sprocket wheels 31 (FIG. 3) 31' (FIG. 5) mounted for rotation on shafts 32, 32' respectively.

The second rotary saw 29 is located centrally of the table 9 between the first saw 19 and the arresting plate 7 and is intended to saw into half lengths logs that have a diameter smaller than a predetermined size. These logs 3' are then discharged into the leftward collector 11. Tree stems of a greater diameter are cut into logs by the first saw 19 and then discharged directly into the rightward collector 13, without being further sawed. All operations are carried out by an operator in the control cab 17.

Figure 2:
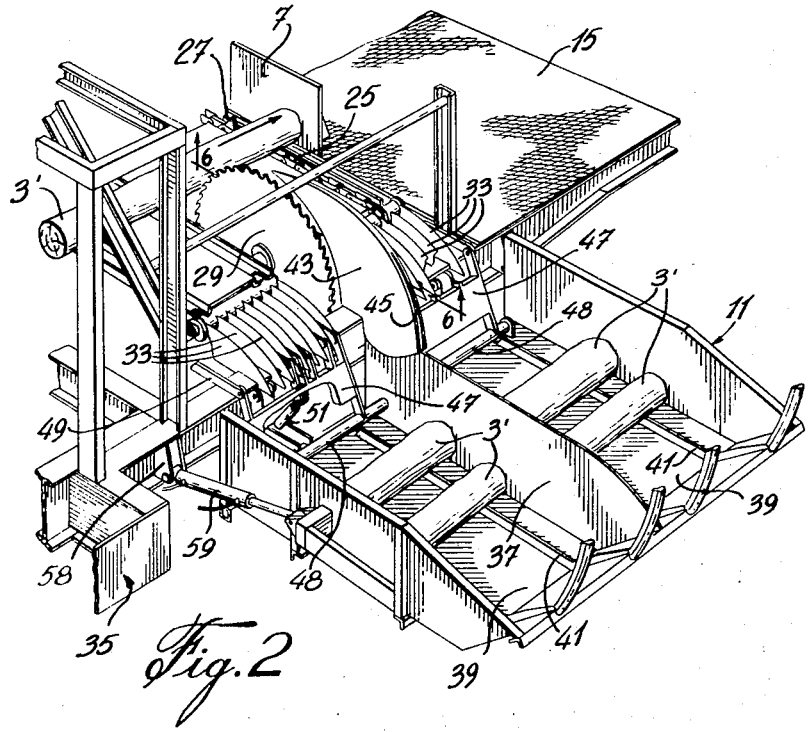
FIG. 2 is a perspective view of one side of the station.

For the sake of clarity in the drawings, only one chain of transfer conveyor has been illustrated in FIG. 2. This transfer conveyor will also hereinafter be referred to by reference numeral 25.

Half length logs are guided into collector 11 (FIG. 2) from the transfer conveyor 25 by a plurality of closely spaced upright plates 33 having an arcuate edge and being secured to the frame 35 of the table 9.

The leftward collector 11, intended to receive the half length logs, is provided with a central longitudinal partition wall 37 projecting from the bottom plate 39. The latter has a series of longitudinal strips 41 intended to lift logs 3' slightly from the bottom plate 39 so that they may be more easily picked up.

In order to prevent logs 3', that have been sawed in two by saw 29, from being thrown upward by the rearward teeth of the saw, a plate 43 is provided for moving the logs away from the saw. This plate 43 extends edgewise around a portion of the saw 29 facing the collector 11. It has a thickness that increases gradually from the saw 29 to the collector 11 to help in spreading the logs 3' and is slitted, as at 45, for a purpose to be determined hereinafter.

In order to prevent logs from piling up in the collectors 11 and 13, close to the discharge end of the transverse conveyor 25, pushing means are provided on the sides of the table to push the logs away therefrom toward the outer ends of the collectors. In the instance shown in FIG. 2, the pushing means comprises a pair of plates 47 acting as the rear side wall of collector 11, plates 47 being pivotally mounted along the lower edge on an axle 48 journalled on the bottom collector 11. In inoperation position, the plates 47 lie against the sloping rear wall structure 53 of the collector 11 and slope downwardly and forwardly therefrom. When it is desired to push to logs 3' that have accumulated at that end, the plates 47 are straightened to reach the vertical position, as shown in dotted lines in FIG. 5, whereby to force the logs 3' forwardly. This movement is obtained by the action of a power ram such as the hydraulic jack 51.

In order to prevent further logs from falling behind the plates 47 when the latter is in the vertical position, there are provided a series of straight arms 49 having one end pivoted to the top of the pushing plates 47 and the other end resting on the top of the table frame 35, these further logs 3' thus moving from the plates 33 to the arms 49 and then falling into the collector 11. The arms 49 are guided in their movement by the spaced plates 33.

As mentioned previously, the sawing and the discharging station of the present invention is for particular use with a slasher of the movable type such as is described in my prior patents mentioned above. Since such a slasher is to be displaced from one site to another as the cutting operation proceeds, it is of interest that the log collectors may be pivoted into vertical position so as to thus reduce, as much as possible, the overall width of the machine.

Figure 3:
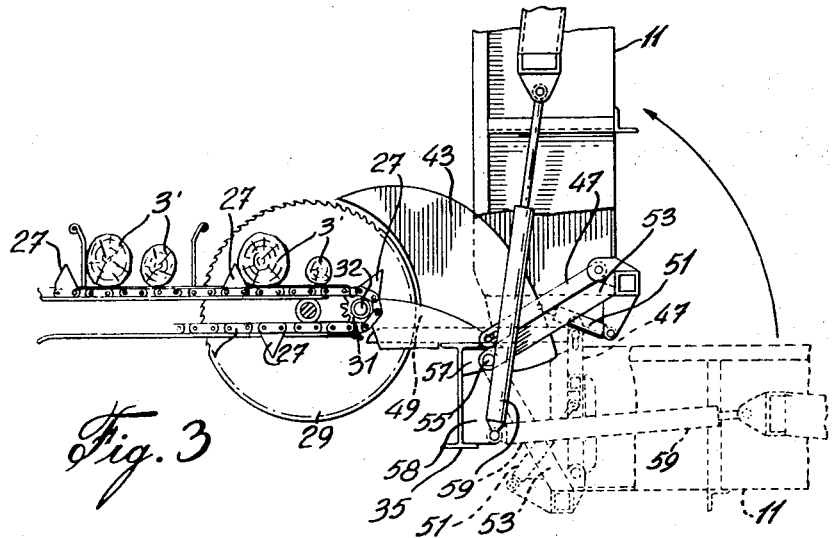
FIG. 3 is a transverse cross-sectional view of the assembly of FIG. 2.

With reference to the collector 11 and FIGS. 2 and 3, in particular, it will be noted that the top of the rear wall structure 53 thereof is pivoted at 55 to a series of brackets 57 located at the top of the table frame 35 and that power rams, such as the hydraulic jack 59, appropriately connected to the lower ends of further brackets 58 and the side walls of collector 11, are responsible for pivoting the said collector 11 in the upright position, shown in full lines in FIG. 3. In this position, the rearward end of partition wall 37 moves in the slit 45 of the guide plate 43.

Figure 4:
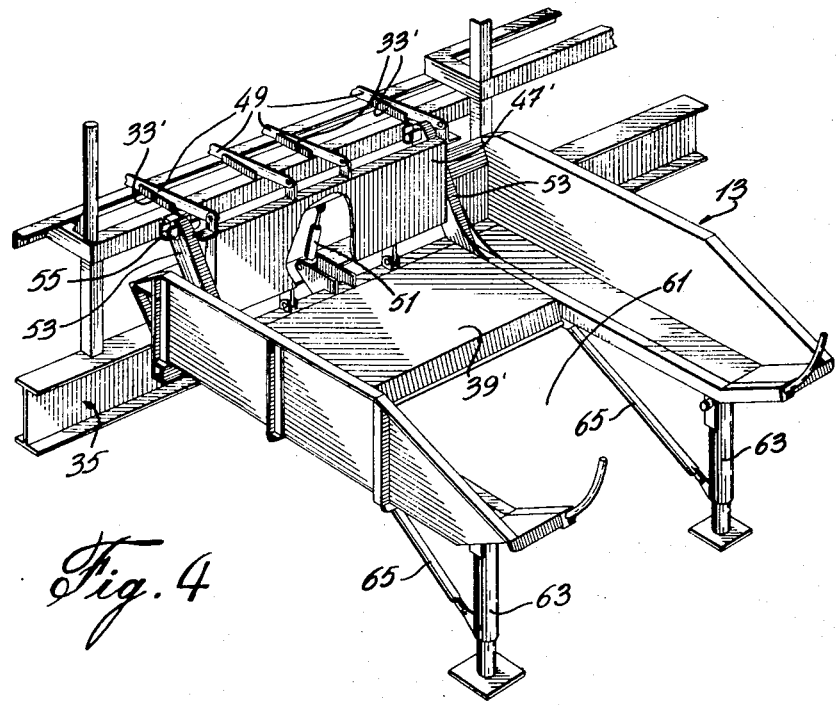
FIG. 4 is a perspective view of the other side of the station.
Figure 5:
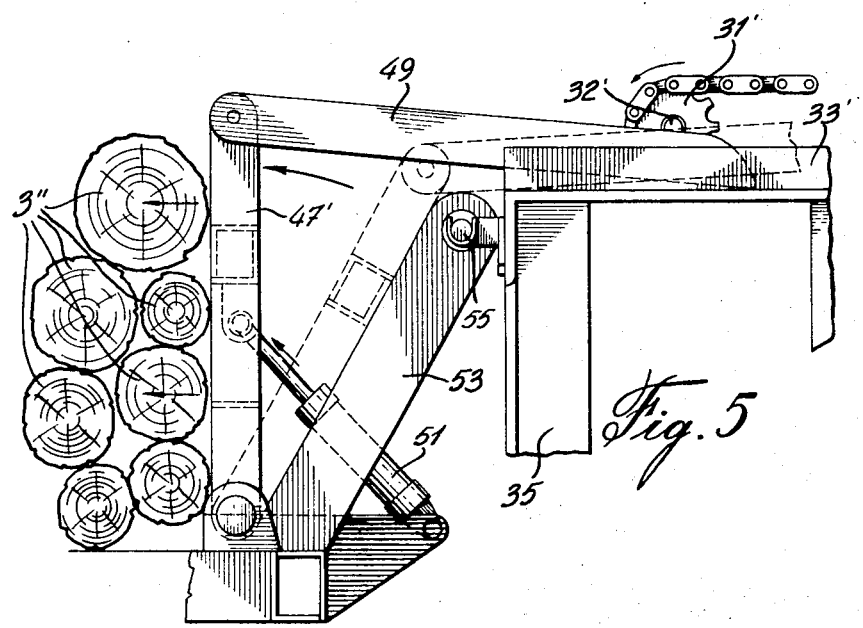
FIG. 5 is a side elevation view of the log pushing means.

The collector 13, as shown in FIG. 4, is generally of the same construction as the collector 11. However, being intended for the reception of the heavier and the longer logs, the following differences should be noted.

In is not longitudinally divided into two parts and the bottom plate 39' rather than having long-raising strips such as 41 in FIG. 2, has a wide forward opening 61 to facilitate gripping of the logs for removal. Also, there is a single pushing plate 47' for forcing the logs 3'' forwardly. In this example, the upright plates 33 of FIG. 2 are replaced by short strips 33' as shown in FIG. 4 for the purpose of guiding arms 49. The pushing means for advancing the logs 33' is generally the same as for the collector 11, as will easily be gathered from FIG. 5.

The collector 13 may also be pivoted upwardly through the action of a power ram (not shown) and through the pivotal connection of the rear wall structure 53 to pivots 55. The forward end of this collector may be kept off the ground by adjustable telescopic legs 63 that may be folded beneath the bottom 39 during transit and kept in vertical position by means of guy rods 65.

As will be understood from the above description of a preferred embodiment of the invention, the latter provides a station that allows selection of the logs obtained in two sizes, discharged therefrom respectively on one or the other side of the transfer table, according to size, while sawing the smaller sized logs into half lengths.

I claim:

1. A sawing and discharging station for a tree slasher provided with a conveyor adapted to drive tree stems in a predetermined direction and having a discharge end, said station comprising a transfer table having a receiving end contiguous to said discharge end of said tree stem conveyor, a tree stem arresting member at the end of said table opposite said receiving end whereby tree stems may be driven by said tree stem conveyor until one end thereof abuts said arresting member, a first rotary saw to cut tree stems that have abutted said arresting member, to produce logs of predetermined full length equal to the length between said first saw and said arresting member, the improvement in the combination therewith comprising:

transfer conveyor means on said table including a transfer conveyor movable perpendicularly to said predetermined direction to discharge logs cut by said first rotary saw selectively on either side of said table;

a second rotary saw mounted on said transfer table in parallel relationship with said first saw but laterally of said tree stem conveyor and arresting member and centrally between said ends of said table whereby to cut logs obtained by said first saw into half length logs, and log collectors mounted on either side of and below said table between said ends to receive said full and half length logs, respectively.

2. A station as claimed in claim 1 including means on at least one side of said table to push logs, that have accumulated in the corresponding collector, away from said table side to make room for incoming logs.

3. A station as claimed in claim 2, wherein said pushing means comprises: a pushing plate extending, in an operative position, at an angle from the edge of said table side down into said corresponding collector; means pivotally mounting the lower end of said pushing plate and means pivoting said pushing plate from said inclined position to a generally upright position to thus move logs accumulated in said corresponding collector away from said table side; said pushing means further including straight arms having one end pivoted to the top edge of said pushing plate and the other end resting on the top of said table, said arms preventing logs from falling between said pushing plate and said table side when said pushing plate is in upright position.

4. A station as claimed in claim 3, including means over said table for guiding said arms as the pushing plate moves from said inoperative to said upright position.

5. A station as claimed in claim 2 including a vertical longitudinal partition wall in the log collector located on the side of said table adjacent said second rotary saw and a guard plate on the downstream end of said second rotary saw and in the plane thereof; said guard plate extending edgewise around a portion of said saw and having a thickness increasing gradually from said second saw to said corresponding collector.

6. A station as claimed in claim 2 wherein said transfer conveyor comprises endless chains and spaced teeth thereon to force logs against said second saw when said transfer conveyor travels in the direction of said second saw.

7. A station as claimed in claim 2 wherein at least one of said collectors is pivotally mounted to said table and means to pivot said collector into an upright position to reduce the width of said station.

* * * * *